United States Patent
McSorley (10) Patent No.: US 9,558,407 B1
(45) Date of Patent: Jan. 31, 2017

(54) METHODS, SYSTEMS, AND MEDIA FOR DETECTING AND PRESENTING RELATED MEDIA CONTENT

(71) Applicant: Google Inc., Mountain View, CA (US)

(72) Inventor: Gareth McSorley, Canton of Zurich (CH)

(73) Assignee: Google Inc., Mountain View, CA (US)

( * ) Notice: Subject to any disclaimer, the term of this patent is extended or adjusted under 35 U.S.C. 154(b) by 108 days.

(21) Appl. No.: 14/571,500

(22) Filed: Dec. 16, 2014

Related U.S. Application Data (60) Provisional application No. 61/920,584, filed on Dec. 24, 2013.

(51) Int. Cl.
  G06K 9/00 (2006.01)
  G06F 17/30 (2006.01)

(52) U.S. Cl.
  CPC ..... *G06K 9/00744* (2013.01); *G06F 17/30386* (2013.01); *G06K 9/00288* (2013.01); *G06K 9/00536* (2013.01)

(58) Field of Classification Search
  CPC ........... G06K 9/00744; G06K 9/00288; G06K 9/00536; G06K 9/00711; G06F 17/30386
  See application file for complete search history.

(56) References Cited

U.S. PATENT DOCUMENTS

| | | | | |
|---|---|---|---|---|
| 8,719,884 B2 * | 5/2014 | Sharon | ................... | H04H 60/59 725/115 |
| 8,971,645 B1 * | 3/2015 | Ning | ..................... | G06K 9/6296 382/103 |
| 2011/0247042 A1 * | 10/2011 | Mallinson | ......... | G06F 17/30026 725/86 |
| 2013/0071031 A1 * | 3/2013 | Huang | ..................... | G06K 9/46 382/190 |
| 2013/0246457 A1 * | 9/2013 | Stojancic | ........... | G06F 17/30023 707/769 |
| 2013/0262431 A1 * | 10/2013 | Garner | ............... | G06F 17/30029 707/713 |
| 2013/0343597 A1 * | 12/2013 | Kocks | ................ | G06K 9/00718 382/100 |

* cited by examiner

*Primary Examiner* — Jon Chang
(74) *Attorney, Agent, or Firm* — Byrne Poh LLP (57) ABSTRACT

Methods, systems, and media detecting and/or presenting related media content are provided. In some embodiments, methods for detecting and presenting related media content are provided, the methods comprising: receiving, using a hardware processor, a query media content item corresponding to a query episode; selecting a portion of the query media content item; receiving at least one reference media content item; determining whether the reference media content item and the query media content item contain matching content; and identifying a related episode corresponding to the reference media content item in response to determining that the reference media item and the query media content item contain matching content.

27 Claims, 9 Drawing Sheets

METHODS, SYSTEMS, AND MEDIA FOR DETECTING AND PRESENTING RELATED MEDIA CONTENT

CROSS-REFERENCE TO RELATED APPLICATIONS

This application claims the benefit of U.S. Provisional Patent Application No. 61/920,584, filed Dec. 24, 2013, which is hereby incorporated by reference herein in its entirety.

TECHNICAL FIELD

The disclosed subject matter relates to methods, systems, and media for detecting and/or presenting related media content.

BACKGROUND

When consuming media content such as a television show, a viewer may want to refer to other media content to follow a storyline developed in the media content. For example, when watching a current episode of a television series that furthers a storyline developed in one or more previous episodes, the viewer may need to watch the one or more previous episodes to understand the current episode.

To help a viewer review the events of a storyline that occurred in one or more previous episodes of a series, conventional approaches present a brief recap section (e.g., a portion of an episode announced as being "previously on" the series) at the beginning of a current episode. However, unless the viewer previously saw the episode(s) shown in the recap section, the recap section typically does not provide the viewer with sufficient background to understand the current episode due to its limited length (e.g., several seconds to a few minutes). Thus, the viewer may still need to review one or more previous episodes to catch-up on the storyline.

To do so, the viewer may have to manually search for previous episodes that relate to the current episode. This can be difficult for the viewer because the viewer may not be aware of the identities of the previous episodes that relate to storyline furthered in the current episode.

Therefore, new mechanisms for detecting and/or presenting related media content are desirable.

SUMMARY

Methods, systems, and media detecting and/or presenting related media content are provided. In some embodiments, methods for detecting and presenting related media content are provided, the methods comprising: receiving, using a hardware processor, a query media content item corresponding to a query episode; selecting a portion of the query media content item; receiving at least one reference media content item; determining whether the reference media content item and the query media content item contain matching content; and identifying a related episode corresponding to the reference media content item in response to determining that the reference media item and the query media content item contain matching content.

In some embodiments, systems for detecting and presenting related media content are provided, the systems comprising: at least one hardware processor that is configured to: receive a query media content item corresponding to a query episode; select a portion of the query media content item; receive at least one reference media content item; determine whether the reference media content item and the query media content item contain matching content; and identify a related episode corresponding to the reference media content item in response to determining that the reference media item and the query media content item contain matching content.

In some embodiments, non-transitory media containing computer-executable instructions that, when executed by a processor, cause the processor to perform a method for detecting and presenting related media content are provided, the method comprising: receiving a query media content item corresponding to a query episode; selecting a portion of the query media content item; receiving at least one reference media content item; determining whether the reference media content item and the query media content item contain matching content; and identifying a related episode corresponding to the reference media content item in response to determining that the reference media item and the query media content item contain matching content.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, as described in more detail below, mechanisms, which can include systems, methods, computer-readable media, etc., for detecting and/or presenting related media content are provided.

These mechanisms can be used in a variety of applications. For example, the mechanisms can provide a user with information about one or more related episodes of media content that relate to a given query episode of media content. In a more particular example in which a given query episode of media content relates to a particular storyline, character, topic, etc., the mechanisms can identify one or more related episodes of media content that relate to the same storyline, character, topic, etc., in some embodiments.

The mechanisms can be implemented with respect to any suitable media content. For example, media content can include any suitable type(s) of content, such as one or more of audio content, video content, text, graphics, multimedia content, closed captioning content, etc. As another example, media content may be provided as part of any suitable media product or service, such as a television series, a video series, a video game series, a movie series, a series of books, a collection of videos associated with one or more users, a collection of videos associated with one or more channels on a video hosting Web site, etc. As yet another example, media content may have any suitable format, such as one or more of JPEG, H.264, MPEG-4 AVC, MPEG-7, MP4, MP3, ASCII codes, etc.

An episode of media content can include an episode of a television series, an episode of a video series, an episode of an audio program, an episode of an audio book, one or more suitable portions of a book, a given video associated with one or more particular users of a video hosting Web site and/or channels on the video hosting Web site, one or more suitable portions of a movie of a movie series, etc.

In order to detect and present related media content, the mechanisms can receive media content associated with a query episode and one or more reference episodes, such as one or more previous episodes in the same series as the query episode. The mechanisms can then analyze one or more suitable portions of the media content associated with the query episode and the media content associated with reference episode(s) using one or more suitable video, audio, image, text, and/or other media content processing algorithms, such as a video matching algorithm, an audio matching algorithm, a facial identification algorithm, a speech identification algorithm, etc., to identify related media content. In some embodiments, a reference episode can be regarded as being related to the query episode and thus a related episode when it contains one or more video scenes, audio scenes, characters, storylines, etc. associated with the query episode. Next, the mechanisms can generate a dependency graph for the query episode showing the relationship between the query episode and the related episodes. Based on the dependency graph, the mechanisms can present the relationship information to a user. For example, for the query episode, the mechanisms can display a list of related episodes and/or one or more graphs indicating a relationship among the query episode and the related episodes (e.g., a bipartite graph, a directed graph, etc.). The mechanisms can additionally or alternatively present one more of the related episodes to a user. For example, the mechanisms can present a thumbnail for each of the related episodes using one or more suitable interfaces, allow a user to select one or more of the related episodes, and render the media content corresponding to the selected related episode(s) to the user.

Figure 1:
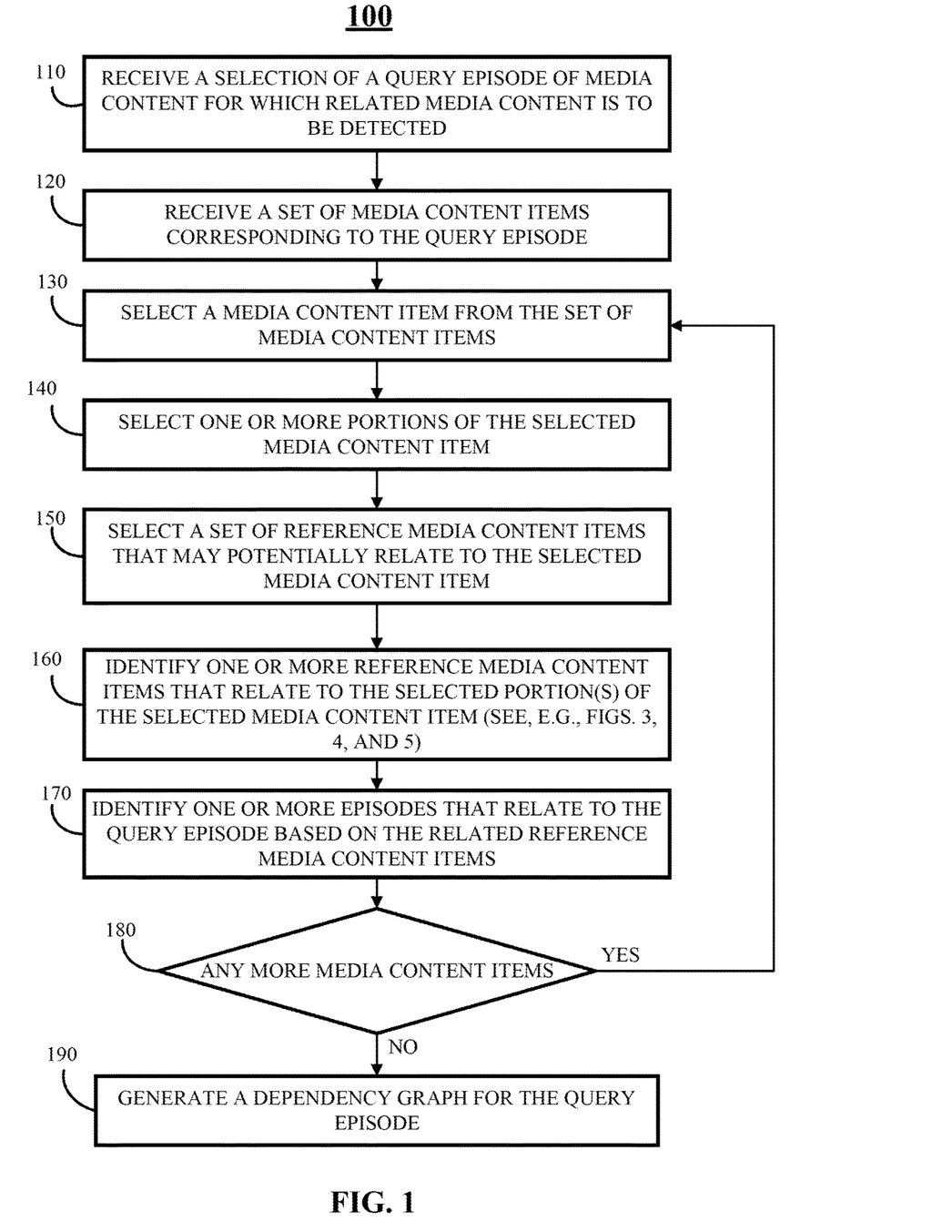
FIG. 1 shows a flow chart of an example of a process for detecting related media content in accordance with some embodiments of the disclosed subject matter.

Turning to FIG. 1, a flow chart of an example 100 of a process for detecting related media content in accordance with some embodiments of the disclosed subject matter is shown.

As illustrated, process 100 can start by receiving, at 110, a selection of a query episode of media content for which related media content is to be detected. This selection can be received in any suitable manner and from any suitable source. For example, this selection can be made by a server sequentially selecting each episode in each series of episodes in a media content database.

Next, at 120, a set of one or more media content items corresponding to the query episode can be received. The media content item(s) in the set can include any suitable type(s) of media content, such as video content, audio content, multimedia content, closed captioning data, etc., and can be in any suitable format, such as video files, audio files, metadata files, etc. The media content item(s) in the set can be received from any suitable source, such as a database of media content.

At 130, process 100 can select a media content item from the set of media content items so that related media content can be detected based on the selected media content item. The selection can be made in any suitable manner. For example, the selected media content item can be selected based on the item being a particular type of media content item (e.g., a video), based on the item being a particular format (e.g., a text file), etc.

At 140, process 100 can select one or more suitable portions of the selected media content item. The selection can be made in any suitable manner. For example, the selected portion(s) may include one or more video scenes, audio scenes, and/or any other suitable content. In a more particular example, the selected portion(s) may correspond to a recap section of the query episode that may include one or more video scenes, audio scenes, etc. generated based on one or more related episodes.

At 150, process 100 can select a set of reference media content items that may potentially relate to the selected media content item. The selection can be made in any suitable manner. For example, reference media content items can be selected as part of the set based on the items corresponding to episodes in the same series of episode as the query episode and having a production date earlier than the query episode.

At 160, process 100 can identify one or more of the reference media content items that relate to the selected portion(s) of the selected media content item. These related reference media content items can be identified in any suitable manner. For example, process 100 can search for reference media content items that contain matching media content, such as video content, audio content, text content, and/or any other suitable content similar to or substantially the same as one or more parts of the selected portion(s) of the selected media content item. In a more particular example, media content associated with a particular reference media content item can be regarded as matching media content when the difference between one or more parts of the selected portion(s) of the selected media content item and the media content associated with the particular reference media content item does not exceed a predetermined threshold. In some embodiments, as described hereinbelow in connection with FIG. 3, matching media content can be detected by analyzing the similarity between a particular reference media content item and the selected media content item using one or more suitable video matching algorithms, audio matching algorithms, and/or any other suitable algorithms.

As another example, process 100 can search for reference media content items that contain one or more characters and/or objects associated with the selected portion(s) of the selected media content item. In a more particular example, as described hereinbelow in connection with FIG. 4, process 100 can identify one or more characters (e.g., an actor, an actress, etc.) and/or objects (e.g., a landmark, etc.) by analyzing the selected portion(s) of the selected media content item using one or more suitable facial recognition techniques, object detection techniques, object tracking techniques, video segmentation techniques, voice recognition techniques, and/or any other suitable techniques. Process 100 can then identify one or more reference media content items that contain media content associated with the identified characters and/or objects.

As yet another example, process 100 can identify one or more related reference media content items based on a transcript associated with the selected portion(s) of the selected media content item. In a more particular example, as described hereinbelow in connection with FIG. 5, process 100 can generate a transcript of the selected portion(s) of the selected media content item (e.g., an audio portion including speech, a recap section, etc.). Process 100 can then search for media content items associated with the transcript based on closed captioning data, audio data, and/or other suitable data associated with the selected media content item. A set of reference media content items can then be analyzed to identify one or more related reference media content items that are associated with one or more portions of the transcript.

Referring back to FIG. 1, process 100 can identify one or more episodes that relate to the query episode at 170. An episode can be regarded as relating to the query episode and thus a related episode in any suitable manner. For example, an episode can be regarded as a related episode when it corresponds to one or more related reference media content items that are identified at 160. In a more particular example, process 100 can designate an episode as being a related episode after identifying a threshold number of related media content items corresponding to the episode. In another more particular example, process 100 can identify an episode that is associated with multiple related media content items (e.g., a video file, an audio file, etc.) and then determine whether the episode is a related episode based on a suitable classifier, such as a support sector machine.

Next, at 180, process 100 can determine whether there are any more media content items to be selected in the set of media content items selected at 120. This determination can be made in any suitable manner. For example, process 100 can determine that there are no more media content items to be selected in the set of media content items when all media content items in the set have been previously selected at 130. As another example, process 100 can determine that there are no more media content items to be selected when a threshold number of related media content items have been identified at 160. As yet another example, process 100 can determine that there are no more media content items to be selected when a threshold number of related episodes to the query episode have been identified at 170. As still another example, process 100 can determine that there are no more media content items to be selected when no additional related media content items are identified after selecting a threshold number of additional selected media content items at 130.

In response to determining that there are more of the set of media content items to be selected, process 100 can loop back to step 130.

Otherwise, process 100 can proceed to 190 to generate a dependency graph for the query episode. The dependency graph can be generated in any suitable manner and can have any suitable format. For example, the dependency graph may include one or more graphs showing the relationship between the query episode and the related episodes associated with the query episode. In a more particular example, the dependency graph may include one or more directed graphs, bipartite graphs, etc. that contain a set of elements corresponding to a set of episodes. In such an example, an edge of the dependency graph may be directed from one element (e.g., an element corresponding to the query episode) to another element that relates to the element (e.g., an element corresponding to a related episode). In another more particular example, process 100 can generate a list of related episodes for the query episode. In some embodiments, process 100 can store the list of related episodes and/or the dependency graph in a suitable storage device.

Figure 2:
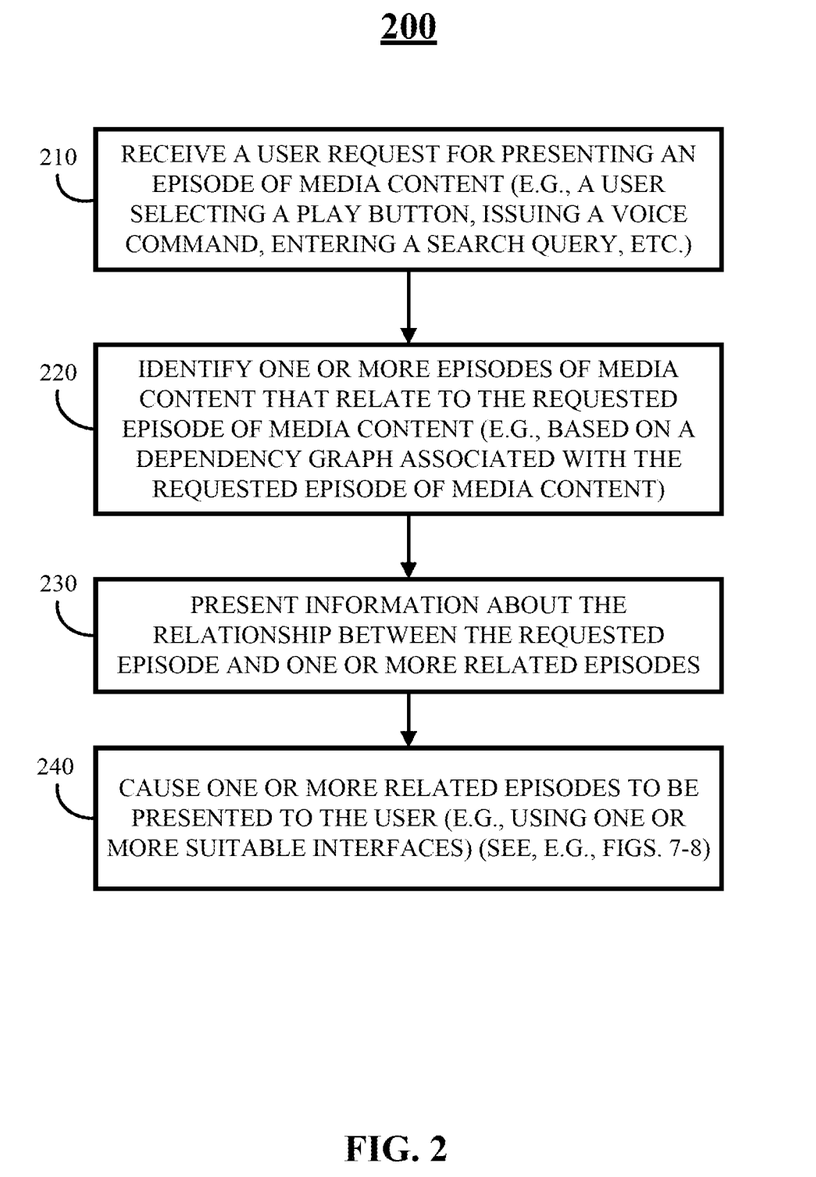
FIG. 2 shows a flow chart of an example of a process for presenting related media content in accordance with some embodiments of the disclosed subject matter.

Turning to FIG. 2, a flow chart of an example 200 of a process for presenting related media content in accordance with some embodiments of the disclosed subject matter is shown.

As illustrated, process 200 can start by receiving a user request for presenting an episode of media content at 210. The request can be received in any suitable manner and from any suitable source. For example, process 200 may present a list of a set of episodes to a user and prompt the user to select an episode in the list.

Figure 6:
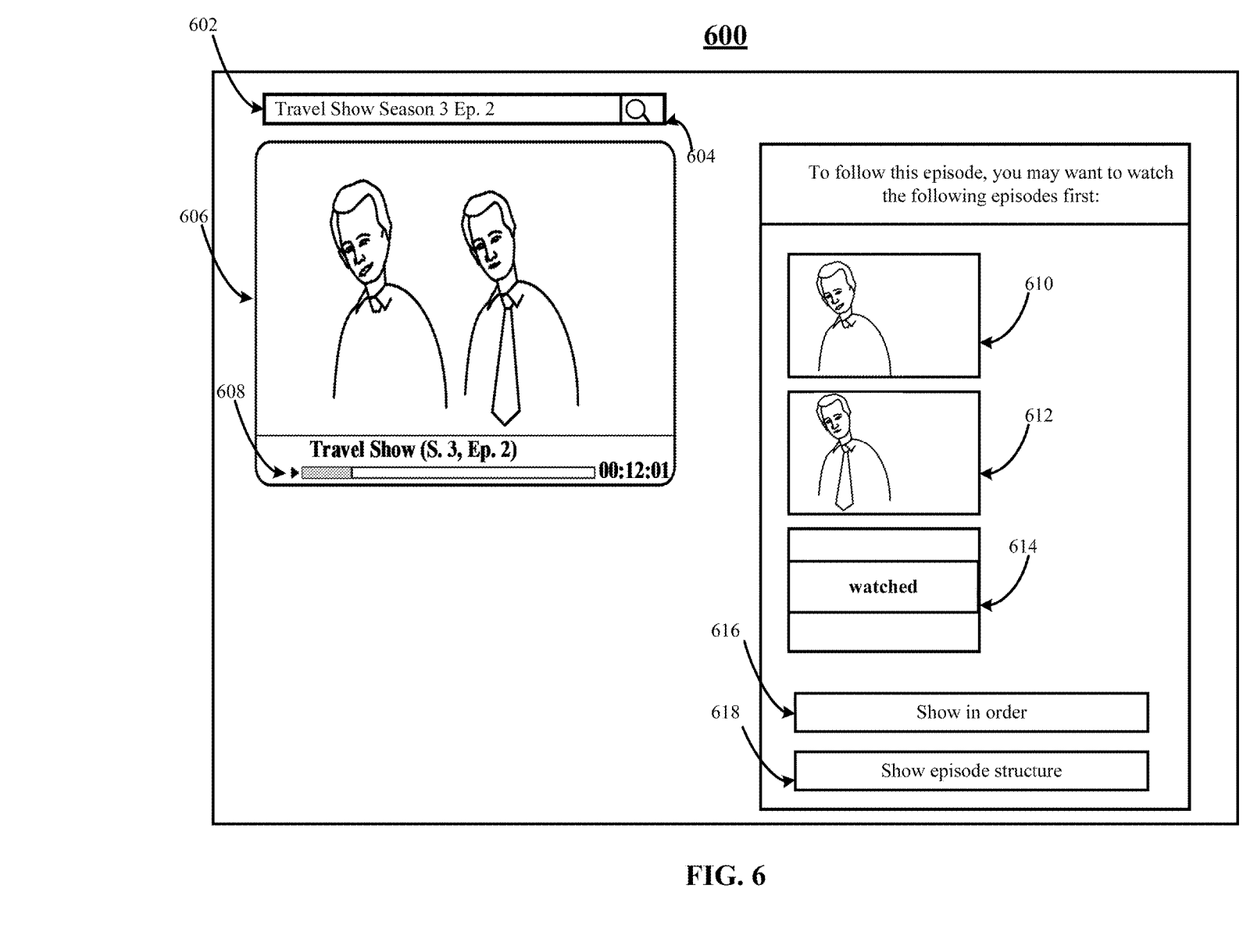
FIG. 6 shows an example of a user interface for presenting related media content in accordance with some embodiments of the disclosed subject matter.

In a more particular example, as shown in FIG. 6, the user request can be received using one or more suitable interfaces. As shown, an interface 600 may include a search term entry field 602 and a search button 604. Search term entry field 602 can be any suitable field for entering search terms for an episode of a media content in accordance with some embodiments. For example, as shown, field 602 can include a text entry box for receiving typed text. As another example, field 602 can include a window for entering hand-written text.

Search button 604 can be any suitable mechanisms for receiving an indication from a user that a search can be performed in accordance with some embodiments. In some embodiments, search button 604 can be omitted and a search can be performed based on the search terms entered in field 602. Alternatively, a search can be performed after a suitable period of item after a user has entered a search term in field 602.

In some embodiments, in response to a user entering one or more search terms corresponding to an episode of media content and indicating a desire to search for the episode of media content, an image and/or other suitable media content relating to the episode of media content can be rendered in a playback window 606. In some embodiments, the user can initiate the presentation of the episode of media content by selecting a play button 608 using a suitable computing device (e.g., a remote control, a mobile phone, a gesture recognition device, a tablet computing device, a wearable computing device, etc.). In some embodiments, the user can issue a voice command (e.g., using a microphone) to select an episode and/or to cause the episode to be presented.

Referring back to FIG. 2, at 220, process 200 can identify one or more episodes that relate to the requested episode. The related episodes can be identified in any suitable manner. For example, an episode can be regarded as being related to the requested episode and thus a related episode when it contains one or more video scenes, audio scenes, characters, storylines, etc. associated with the requested episode. As another example, one or more related episodes can be identified based on a dependency graph associated with the requested episode. In a more particular example, process 200 can retrieve a dependency graph showing the relationship between the requested episode and one or more related episodes, such as a bipartite graph, a directed graph, a list of episodes that relate to the requested episode, etc. Process 200 can then identify one or more media content items that relate to the requested episode based on the dependency graph.

In some embodiments, process 200 can present information about the relationship between the requested episode and one or more related episodes at 230. Such information can be presented in any suitable manner. For example, process 200 can display a list of related episodes using one or more suitable interfaces. In a more particular example, a list can be presented to a user prior to and/or during the playback of the requested episode. In another more particular example, process 200 can present to the user one or more context links associated with one or more of the related episodes when rendering the requested episode (e.g., when rendering a recap section of the requested episode and/or any other suitable portions of the requested episode).

In yet another more particular example, as shown in FIG. 6, an interface 600 can be presented to the user to recommend related episodes and/or to prompt the user to view a related episode. As illustrated, information about one or more of the related episodes can be presented in regions 610, 612, and 614. Any suitable information relating to a related episode can be presented in some embodiments, such as an image associated with the media content item, a title of the related media content item, a source of the related media content item, etc. It should be noted that such information can be presented in any suitable manner, such as a scrollable list of images where images are presented one at a time, multiple images presented at a time, etc.

Figure 7:
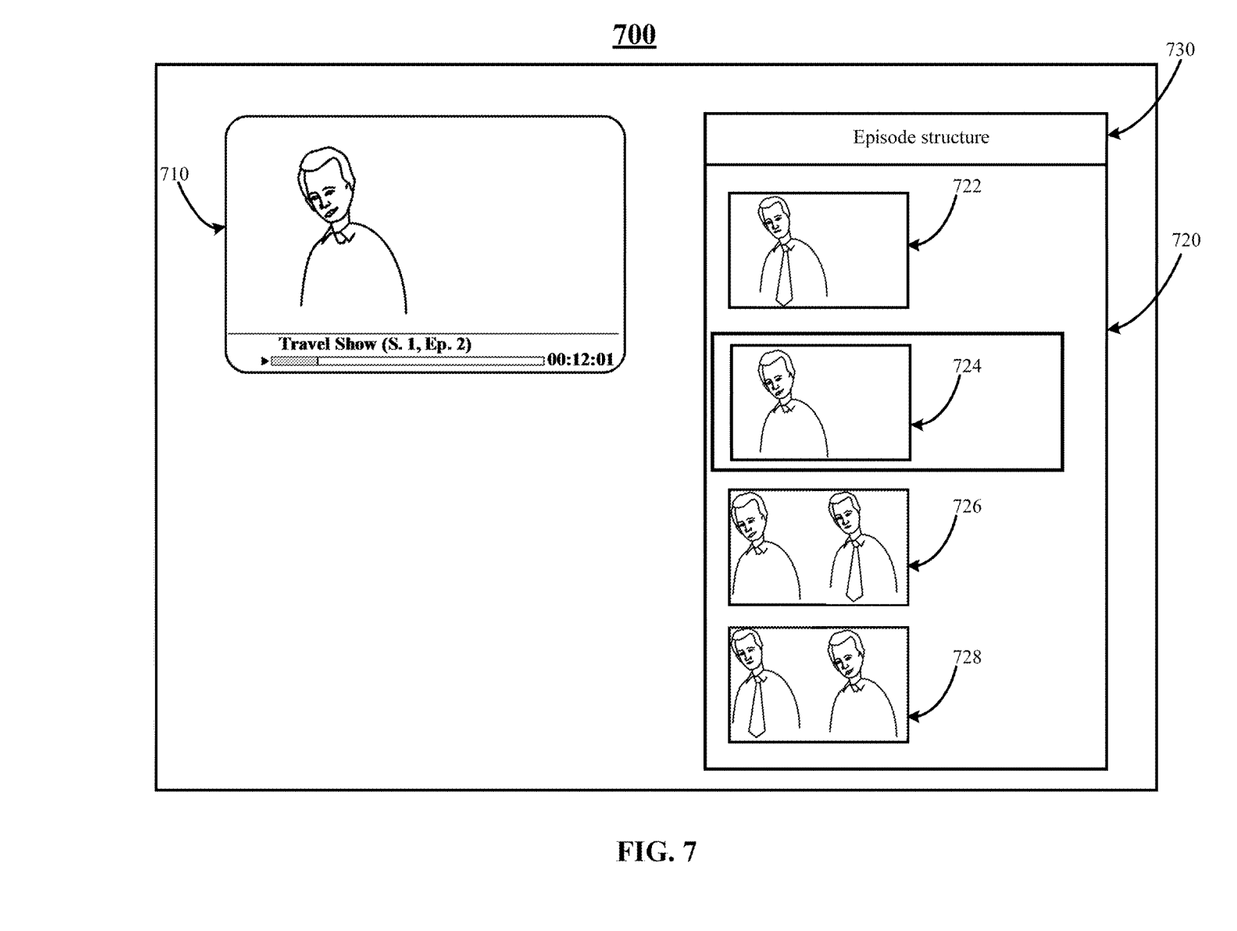
FIG. 7 shows an example of a user interface for presenting related media content in chronological order in accordance with some embodiments of the disclosed subject matter.

In some embodiments, interface 600 can provide a user with one or more filters and/or sort options to rearrange and/or select one or more of the related episodes. For example, a set of related episodes can be sorted and/or presented in chronological order, based on their relationship, etc. In a more particular example, in response to the user indicating a desire to view the related episodes in chronological order (e.g., by selecting a "show in order" button 616 of interface 600), an interface 700 as illustrated in FIG. 7 can be presented to the user. As shown, interface 700 may include a playback area 710, a related episode presentation area 720, a sort option 730, and/or any other suitable components. Related media content presentation area 720 can include any suitable information about one or more related episodes, such as an image of each of the related episodes, a description of each of the related media content items, etc. For example, as shown in FIG. 7, images 722, 724, 726, and 728, each of which corresponds to a related episode, can be presented in area 720. In some embodiments, each of images 722, 724, 726 and 728 can be selectable. In response to a user selecting an image and/or other suitable information relating to a particular related episode, the selected related episode can be rendered in playback area 710. In some embodiments, the image and/or other information relating to the episode that is being rendered in playback area 710 can be highlighted.

Figure 8:
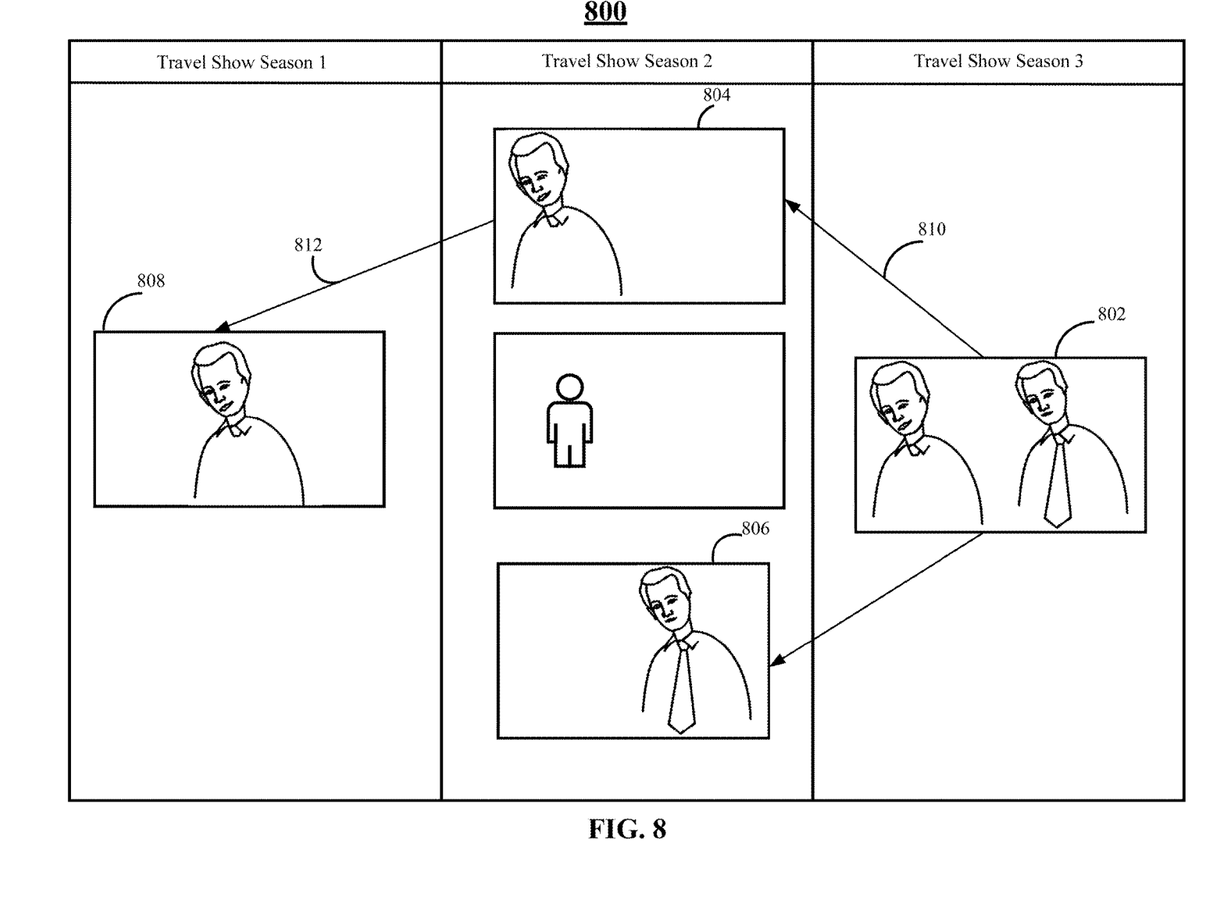
FIG. 8 shows an example of a user interface for presenting related media content based on a dependency graph in accordance with some embodiments of the disclosed subject matter.

As another example, a graph indicating a relationship among multiple episodes can be presented using one or more suitable interfaces. In a more particular example, as illustrated in FIG. 8, an interface 800 can be presented to the user to illustrate the relationship between the requested episode and one or more related episodes. In some embodiments, interface 800 can be presented in response to a user indicating a desire to view a set of related episodes based on their relationship (e.g., by selecting a "show episode structure" button 618 of FIG. 6 or a "show episode structure" 730 of FIG. 7).

As shown, interface 800 can include a set of images and/or other suitable information relating to a set of episodes. For example, each of images 802, 804, 806, and 808 can correspond to an episode. In some embodiments, the images presented in interface 800 can be selectable. In response to a user selecting one or more of the images, an episode corresponding to the image can be presented to the user using one or more suitable interfaces.

In some embodiments, interface 800 can present information about the relationship among multiple episodes in any suitable manner. For example, image 802 of interface 800 can be connected to image 804 to indicate that the episode associated with image 802 refers to the episode associated with image 804 (e.g., through an arrow 810 that directs from image 802 to image 804). Similarly, image 804 can be connected to image 808 to indicate that the episode associated with image 804 refers to the episode associated with image 808 (e.g., through an arrow 812 that directs from image 804 to image 808).

Referring back to FIG. 2, in some embodiments, process 200 can select one or more of the related episodes and present information about the selected related episodes at 230. The selection can be made based on any suitable criteria. For example, process 200 can determine whether one or more of the related episodes have been previously presented to the user based on a browsing history and/or any other suitable information associated with a user. Process 200 can then present one or more of the related episodes that have not been viewed by the user. Alternatively, when presenting information about a related episode, process 200 can identify the related episode as having been previously presented using a suitable interface (e.g., such as a greyed out image 614 as shown in FIG. 6).

In some embodiments, process 200 can cause one or more related episodes to be presented at 240. The related episodes can be presented in any suitable manner. For example, process 200 can allow a user to select one or more related episodes and cause the selected episodes to be presented to the user. In a more particular example, process 200 can present a set of images (e.g., thumbnails, etc.) for a set of related episodes using one or more suitable interfaces, such as one or more of interface 600, interface 700, interface 800, etc. Process 200 can then allow a user to select one or more of the related episodes using the interface(s) (e.g., by selecting one or more images corresponding to the related episodes) and render the media content corresponding to the selected episode(s) to the user.

Figure 3:
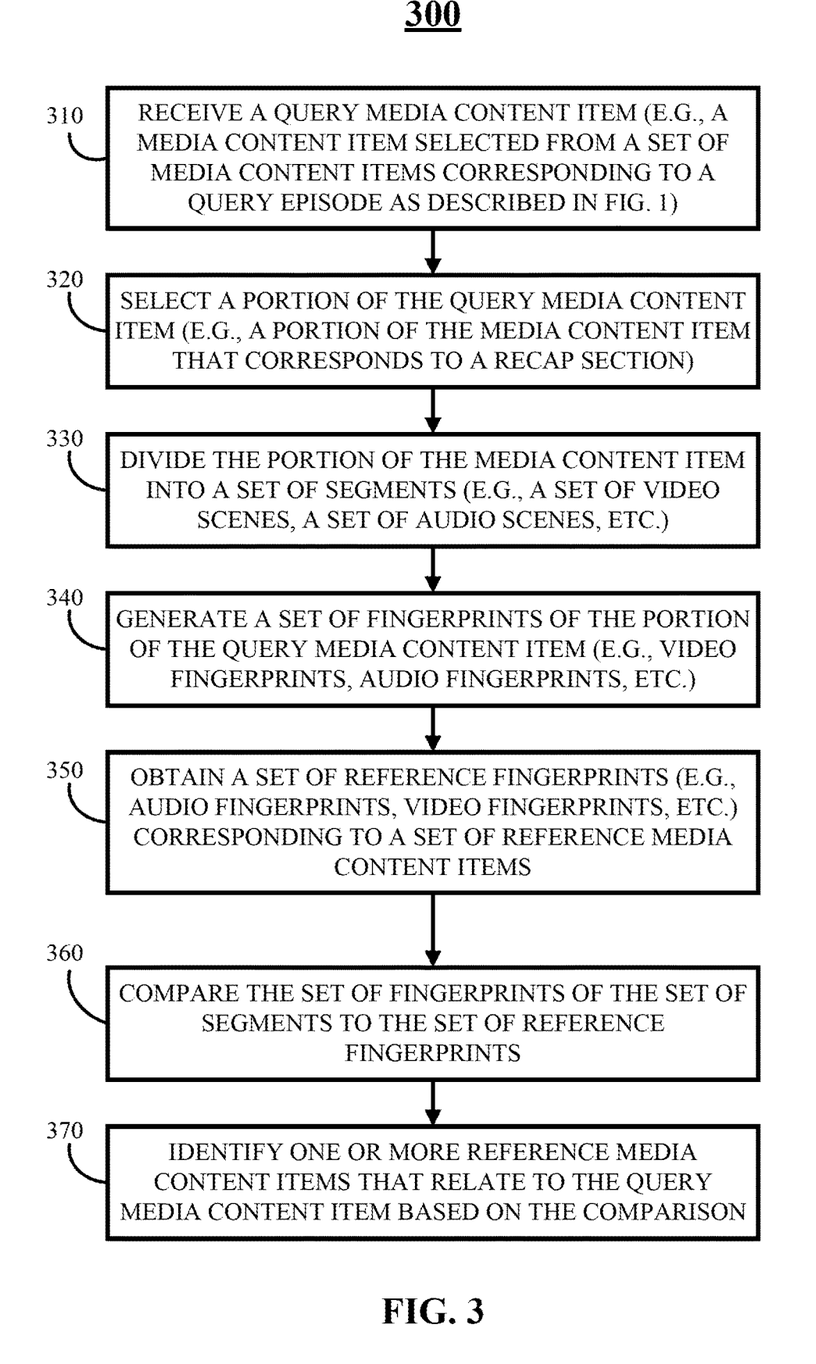
FIG. 3 shows a flow chart of an example of a process for detecting related media content based on matching media content in accordance with some embodiments of the disclosed subject matter.

Turning to FIG. 3, a flow chart of an example 300 of a process for identifying related media content items based on video matching and/or audio matching techniques in accordance with some embodiments of the disclosed subject matter is shown.

As shown, process 300 can start by receiving a query media content item at 310. The query media content item can contain any suitable media content for which related media content needs to be detected. For example, the query media content item can contain one or more of video content, audio content, closed captioning content, etc. corresponding to an episode of media content. In a more particular example, the query media content item can be selected from a set of media content items (e.g., a video, a text file, etc.) corresponding to a particular episode (e.g., a query episode as described in connection with FIG. 1).

Next, a portion of the query media content item can be selected at 320. Any suitable portion of the query media content item may be selected to identify media content relating to the query media content item. For example, the selected portion may include one or more video scenes, audio scenes, and/or any other suitable content relating to other media content items. In a more particular example, the selected portion may correspond to a recap section of an episode and may include one or more video scenes, audio scenes, etc. that are generated based on one or more related episodes.

At 330, process 300 may divide the portion of the query media content item into a set of segments. The division can be performed in any suitable manner. For example, the portion of the query media content item may be divided into a set of video scenes. In a more particular example, a set of video frames that contain similar video content can be grouped into a video scene (e.g., where the difference between two consecutive video frames does not exceed a predetermined threshold). In another more particular example, a set of video frames that contain one or more particular objects (e.g., actors, actresses, landmarks, etc.) can be grouped into a video scene.

As another example, the portion of the query media content item may be divided into a set of audio scenes. In a more particular example, each of the audio scenes may contain one or more audio frames including similar features (e.g., amplitudes, frequencies, phases, etc.). In another more particular example, each of the set of audio scenes may correspond to a segment of the query media content item corresponding to a given time interval, a given frequency band, etc. In yet another more particular example, the portion of the query media content item can be divided into multiple segments that contain different types of audio content, such as speech, non-speech, etc.

At 340, process 300 can generate a set of fingerprints of the portion of the query media content item. The set of fingerprints can include any suitable representations of video content, audio content, and/or other suitable content of the query media content item. For example, the set of fingerprints may include one or more video fingerprints generated using a suitable video fingerprinting technique. In a more particular example, one or more video fingerprints can be generated for each of the segments obtained at 330. More particularly, for example, the video fingerprints can be generated by extracting a representative frame from a video scene (e.g., a key frame). Alternatively or additionally, the video fingerprints can be generated by calculating one or more spatial characteristics (e.g., one or more vectors corresponding to intensity variations, edge differences, etc. within a particular frame), temporal characteristics, (e.g., motion vectors, motion trajectories, etc.), spatiotemporal characteristics, (e.g., by performing a wavelet transformation on a video segment), and/or other suitable characteristics of one or more of the multiple segments.

As another example, the set of fingerprints may include one or more audio fingerprints. The audio fingerprints can include any suitable digital representations of one or more suitable audio features of the query media content item, where the audio fingerprints can be used to identify the same or similar portions of the query media content item. In some embodiments, the audio fingerprints can be generated using any suitable audio fingerprinting algorithms, which may include one or more suitable two-dimensional transforms (e.g., a discrete cosine transform), three-dimensional transforms (e.g., a wavelet transform), hash functions, etc. In a more particular example, one or more features of the audio content of the query media content item (e.g., peaks, amplitudes, power levels, frequencies, signal to noise ratios, etc.) can be generated for each of the segments obtained at 330. The features can then be processed to form one or more audio fingerprints (e.g., using one or more hash functions, etc.).

At 350, process 300 can obtain a set of reference fingerprints corresponding to one or more reference media content items. For example, the set of reference fingerprints may include one or more video fingerprints, audio fingerprints, etc. that can represent the media content of one or more of the reference media content items.

At 360, process 300 can compare the set of fingerprints of the portion of the query media content item to the set of reference fingerprints. Such comparison can be performed in any suitable manner. For example, the fingerprints corresponding to a segment of the portion of the query media content item can be compared to the set of reference fingerprints to detect a match.

At 370, process 300 can identify one or more reference media content items that relate to the query media content item based on the comparison. For example, in response to detecting a reference fingerprint that matches at least one fingerprint associated with the query media content item, process 300 can designate the reference media content item corresponding to the reference fingerprint as a related media content item. As another example, process 300 can designate a reference media content item as a related media content item in response to determining that the reference media content item contains at least a threshold number of matching reference fingerprints.

Figure 4:
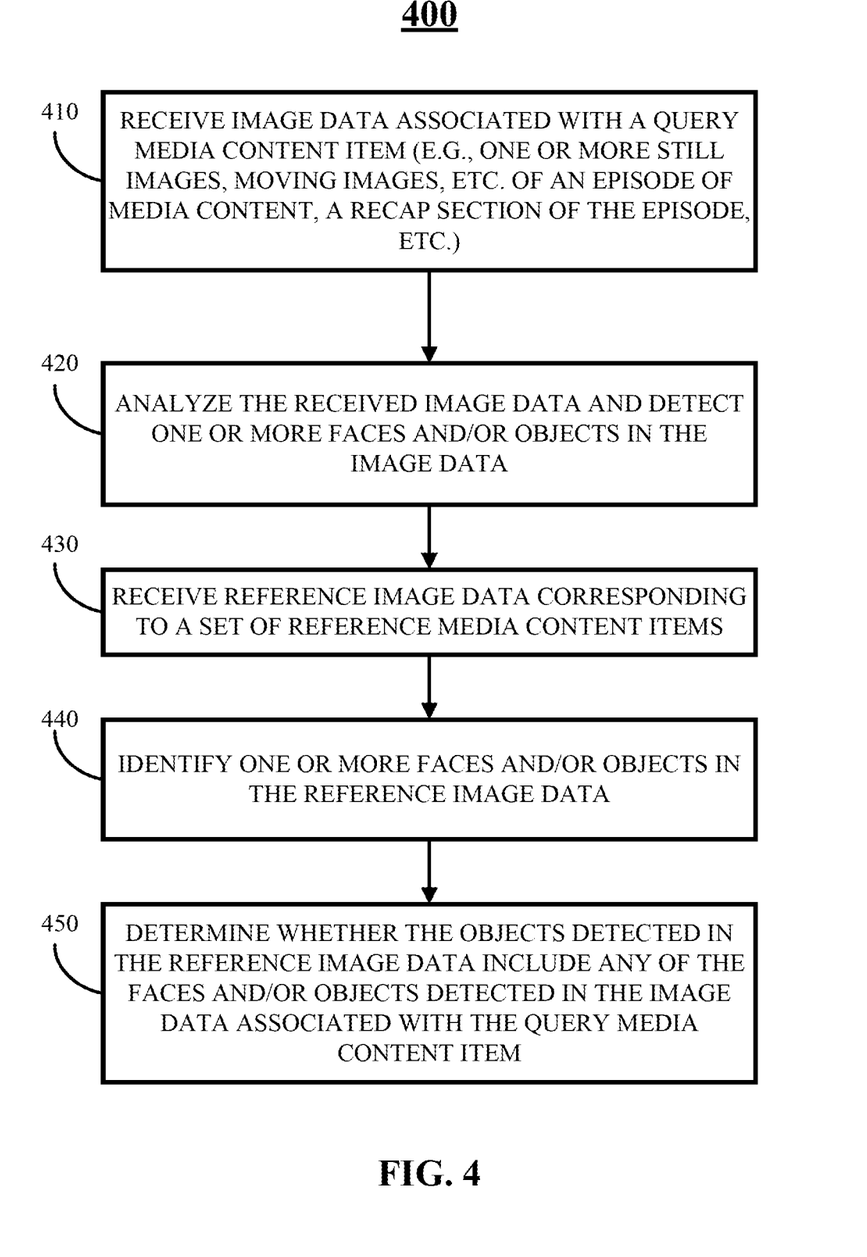
FIG. 4 shows a flow chart of an example of a process for detecting related media content by detecting objects of interest in accordance with some embodiments of the disclosed subject matter.

Turning to FIG. 4, a flow chart of an example 400 of a process for detecting related media content by detecting objects of interest in accordance with some embodiments of the disclosed subject matter is shown.

As illustrated, process 400 can start by receiving image data associated with a query media content item at 410. The query media content item can contain any suitable media content, such as video content, audio content, multimedia content, closed captioning data, etc. For example, the query media content item may correspond to an episode of media content. In a more particular example, the query media content item can be selected from a set of media content items (e.g., a video, a text file, etc.) corresponding to a particular episode (e.g., a query episode as described in connection with FIG. 1).

Next, at 420, process 400 can analyze the received image data and detect one or more faces and/or objects in the image data. The detection can be performed in any suitable manner, such as using one or more suitable facial recognition techniques, object detection techniques, object tracking techniques, video segmentation techniques, and/or any other suitable techniques. In a more particular example, an actor or actress can be identified in the image data using any suitable image-based facial recognition method, such as the OKAO VISION face detector available from OMRON CORPORATION of Kyoto, Japan. In some embodiments, after the actor or actress is identified in the image data, any suitable tracking algorithm can be used to track the actor or actress, such as blob tracking, kernel-based tracking, contour tracking, visual feature matching, etc. Additionally or alternatively, process 400 can determine a set of facial features for each person detected in the image data and/or store the extracted facial features in a suitable storage device.

At 430, process 400 can receive reference image data corresponding to a set of reference media content items. The reference media content items can contain any suitable content that may potentially relate to the query media content item. For example, in the embodiments in which the query media content item corresponds to a query episode, the set of reference media content items may correspond to one or more episodes in the same series of episode as the query episode and having a production date earlier than the query episode. In such an example, the reference image data may include one or more still images, moving images, etc. associated with the reference media content items.

At 440, process 400 can identify one or more faces or objects in the reference image data. The faces and/or objects can be identified in any suitable manner. For example, one or more faces and/or objects can be identified in the image data using one or more suitable facial recognition, object detection, object tracking, and/or any other suitable techniques.

At 450, process 400 can determine whether the face(s) and/or object(s) detected in the reference image data include any of the face(s) and/or object(s) detected in the image data associated with the query media content item. The determination can be made in any suitable manner. For example, process 400 can compare an image of a face or an object detected in the query media content item to an image of a face or an object detected in the reference image data. Process 400 can then determine whether a face and/or an object detected in the reference image data matches one or more of the faces and/or objects detected in the image data associated with the query media content item.

In a more particular example, the comparison can be made by measuring the similarity between the two images based on one or more suitable metrics, such as a sum of absolute difference (SAD), a sum of absolute transformed difference (SATD), a sum of squared difference (SSD), etc. In some embodiments, a match can be identified when the similarity between the two images is not greater than a predetermined threshold.

As another example, process 400 can extract a set of features of a particular object detected in the reference image data (e.g., such as a set of facial features of an actor or actress). Process 400 can then compare the set of features to a set of features associated with an object of interest and determine whether a match is detected based on the comparison. In a more particular example, two objects can be considered as matching objects when the difference between the two set of features is not greater than a predetermined threshold.

Figure 5:
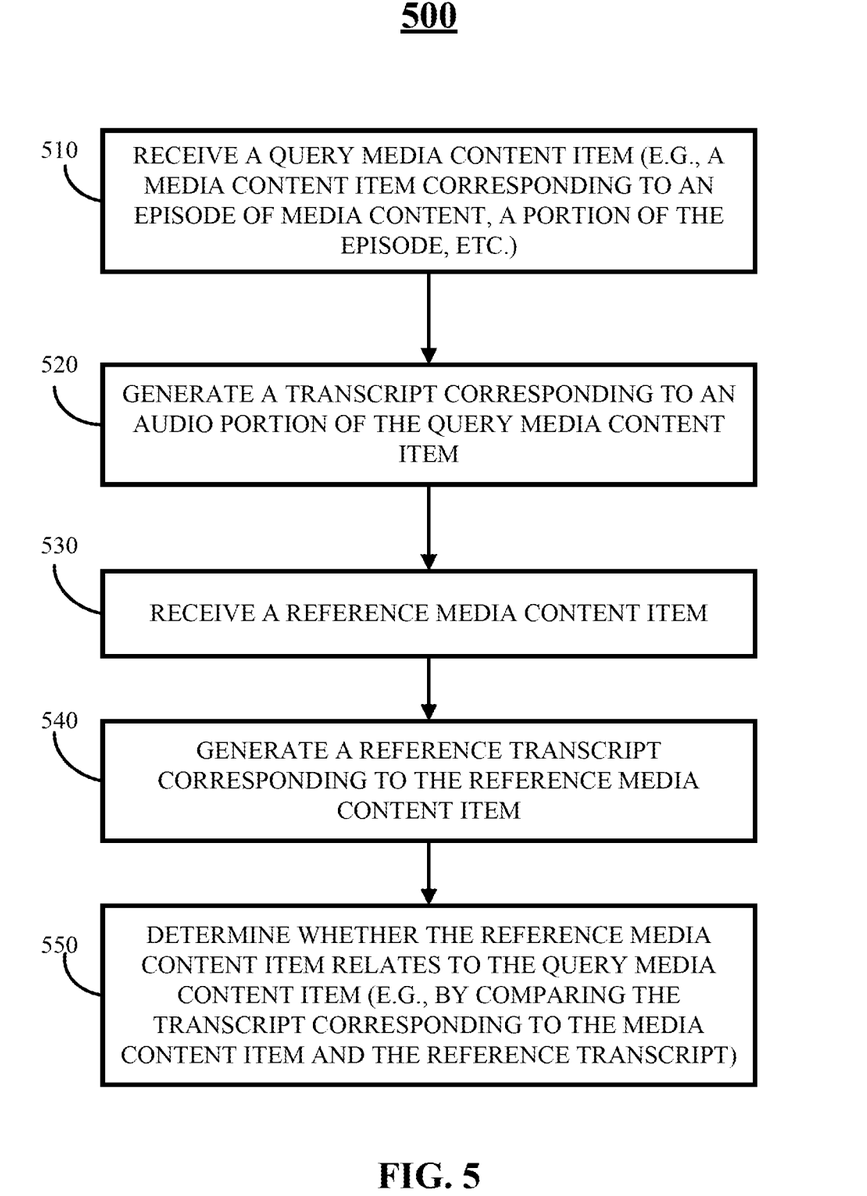
FIG. 5 shows a flow chart of an example of a process for detecting media content relating to a query media content item based on a transcript associated with the query media content item in accordance with some embodiments of the disclosed subject matter.

Turning to FIG. 5, an example 500 of a process for identifying related media content for a query media content item based on a transcript associated with the query media content item in accordance with some embodiments of the disclosed subject matter is shown.

As illustrated, process 500 can start by receiving a query media content item at 510. The query media content item can contain any suitable media content, such as video content, audio content, multimedia content, closed captioning data, etc. For example, the query media content item may correspond to an episode of media content. In a more particular example, the query media content item can be selected from a set of media content items (e.g., a video, a text file, etc.) corresponding to a particular episode (e.g., a query episode as described in connection with FIG. 1).

At 520, process 500 can generate a transcript corresponding to an audio portion of the query media content item. The audio portion can include any suitable audio content associated with the query media content item that can be used to generate the transcript. For example, the audio portion can correspond to speech.

In some embodiments, the transcript can be generated in any suitable manner. For example, process 500 can retrieve closed captioning data associated with the audio portion of the query media content item. The transcript can then be generated based on the retrieved closed captioning data. As another example, process 500 can detect speech in the audio portion of the query media content item. Process 500 can then convert the speech into text. (e.g., using a suitable speech recognition algorithm).

At 530, process 500 can receive a reference media content item. The reference media content item can contain any suitable media content that may relate to the content of the query media content item. For example, the reference media content item may contain video content, audio content, closed captioning data, and/or other suitable content that are similar to or the same as one or more suitable portion of the query media content item.

Next, at 540, process 500 can generate a reference transcript corresponding to the reference media content item. The reference transcript can be generated in any suitable manner. For example, the reference transcript can be generated based on closed captioning data associated with the reference media content item. As another example, the reference transcript can be generated based on one or more suitable speech recognition algorithms. In a more particular example, process 500 can identify and extract speech from the reference media content item. Process 500 can then convert the speech into text based on a suitable algorithm (e.g., such as a speech recognition algorithm).

At 550, process 500 can determine whether the reference media content item relates to the query media content item. The determination can be made in any suitable manner. For example, process 500 can compare the transcript associated with the query media content item and the reference transcript and determine whether the reference transcript contains at least a portion of the transcript associated with the query media content item.

It should be noted that the above steps of the flow diagrams of FIGS. 1-5 can be executed or performed in any order or sequence not limited to the order and sequence shown and described in the figure. Also, some of the above steps of the flow diagrams of FIGS. 1-5 can be executed or performed substantially simultaneously where appropriate or in parallel to reduce latency and processing times. Furthermore, it should be noted that FIGS. 1-5 is provided as examples only. At least some of the steps shown in these figures may be performed in a different order than represented, performed concurrently, or altogether omitted.

Figure 9:
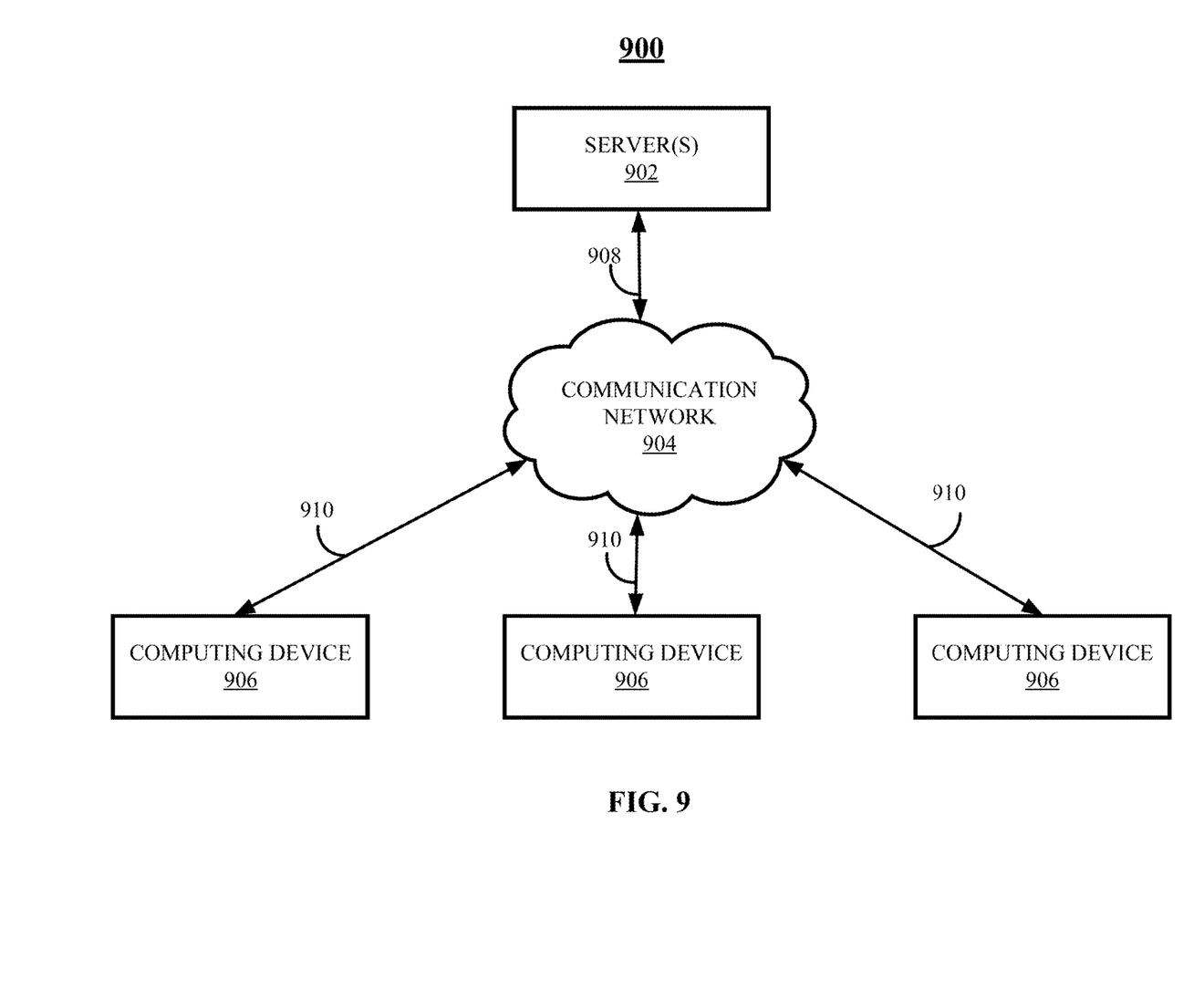
FIG. 9 shows a generalized block diagram of an example of a system for detecting and/or presenting related media content in accordance with some embodiments of the disclosed subject matter.

Turning to FIG. 9, a generalized block diagram of an example 900 of a system for detecting and/or presenting related media content in accordance with some embodiments of the disclosed subject matter is shown. As illustrated, system 900 can one or more servers 902, a communication network 904, one or more computing devices 906, communication links 908 and 910, and/or any other suitable components. In some embodiments, one or more suitable portions of processes 100, 200, 300, 400, and 500 as illustrated in FIGS. 1-5 can be implemented in one or more components of system 900. For example, one or more suitable portions of processes 100, 200, 300, 400, and 500 can run on server(s) 902 and/or computing device(s) 906 of system 900.

Server(s) 902 can include any suitable device that is capable of detecting and/or presenting related media content, and/or performing any other suitable functions, such as a hardware processor, a computer, a data processing device, or a combination of such devices. In some embodiments, server(s) 902 can be connected by one or more communication links 908 to communication network 904.

Computing device(s) 906 can include any suitable device that is capable of detecting and/or presenting related media content and/or performing any other suitable functions, such as a mobile phone, a tablet computer, a laptop computer, a desktop computer, a personal data assistant (PDA), a portable email device, a game console, a remote control, a voice recognition system, a gesture recognition system, a wearable computing device, and/or any other suitable device. Although three user devices 906 are shown in FIG. 9 to avoid over-complicating the drawing, any suitable number of these devices, and suitable types of these devices, can be used in some embodiments. Computing device(s) 906 can be connected by one or more communication links 910 to communications network 904.

Each of server(s) 902 and computing device(s) 906 can include and/or be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, a display device (e.g., a CRT display, a LCD, a LED display, a plasma display, a touch-screen display, etc.), a storage device (which can be a hard drive, a digital video recorder, a solid state storage device, a gaming console, a removable storage device, and/or any other suitable storage device), etc.

Communication network 904 can be any suitable computer network such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a satellite network, a mobile phone network, a mobile data network, a cable network, a telephone network, a fiber optic network, and/or any other suitable communication network, or any combination of any of such networks.

Communication links 908 and 910 can be any suitable communication links, such as network links, dial-up links, wireless links, hard-wired links, any other suitable communication links, or a combination of such links.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), and/or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, methods, systems, and media for detecting and/or presenting related media content items are provided.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is limited only by the claims that follow. Features of the disclosed embodiments can be combined and rearranged in various ways.

What is claimed is:

1. A method for detecting and presenting related media content, the method comprising:
    receiving, using a hardware processor, a query media content item corresponding to a query episode;
    selecting a portion of the query media content item;
    receiving at least one reference media content item;
    determining whether the reference media content item and the query media content item contain matching content;
    identifying a related episode corresponding to the reference media content item in response to determining that the reference media item and the query media content item contain matching content; and
    generating a dependency graph based at least in part on the query episode and the related episode.

2. The method of claim 1, wherein the query media content item contains at least one video scene.

3. The method of claim 2, further comprising:
    generating at least one video fingerprint from the portion of the query media content item; and
    determining whether the reference media content item and the query media content item contain matching content based at least in part on the video fingerprint.

4. The method of claim 1, wherein the query media content item contains at least one audio scene.

5. The method of claim 4, further comprising:
    generating at least one audio fingerprint from the portion of the query media content item; and
    determining whether the reference media content item and the query media content item contain matching content based at least in part on the audio fingerprint.

6. The method of claim 1, further comprising:
    obtaining a transcript corresponding to the portion of the query media content item; and determining whether the reference media content item and the query media content item contain matching content based at least in part on the transcript.

7. The method of claim 1, wherein the dependency graph for the query episode includes relationship information between the query episode and a plurality of related episodes that includes the identified related episode.

8. The method of claim 1, further comprising:
receiving a user selection of the query episode;
identifying the related episode based at least in part on the dependency graph in response to receiving the user selection; and
causing media content corresponding to the query episode and the related episode to be presented.

9. The method of claim 1, further comprising:
detecting at least one face in an image associated with the query media content item using a facial recognition technique; and
identifying the detected face in an image associated with the reference media content item.

10. A system for detecting and presenting related media content, the system comprising:
at least one hardware processor that is configured to:
receive a query media content item corresponding to a query episode;
select a portion of the query media content item;
receive at least one reference media content item;
determine whether the reference media content item and the query media content item contain matching content;
identify a related episode corresponding to the reference media content item in response to determining that the reference media item and the query media content item contain matching content; and
generate a dependency graph based at least in part on the query episode and the related episode.

11. The system of claim 10, wherein the query media content item contains at least one video scene.

12. The system of claim 11, wherein the hardware processor is further configured to:
generate at least one video fingerprint from the portion of the query media content item; and
determine whether the reference media content item and the query media content item contain matching content based at least in part on the video fingerprint.

13. The system of claim 10, wherein the query media content item contains at least one audio scene.

14. The system of claim 13, wherein the hardware processor is further configured to:
generate at least one audio fingerprint from the portion of the query media content item; and
determine whether the reference media content item and the query media content item contain matching content based at least in part on the audio fingerprint.

15. The system of claim 10, wherein the hardware processor is further configured to:
obtain a transcript corresponding to the portion of the query media content item; and
determine whether the reference media content item and the query media content item contain matching content based at least in part on the transcript.

16. The system of claim 10, wherein the dependency graph for the query episode includes relationship information between the query episode and a plurality of related episodes that includes the identified related episode.

17. The system of claim 10, wherein the hardware processor is further configured to:
receive a user selection of the query episode;
identify the related episode based at least in part on the dependency graph in response to receiving the user selection; and
cause media content corresponding to the query episode and the related episode to be presented.

18. The system of claim 10, wherein the hardware processor is further configured to:
detect at least one face in an image associated with the query media content item using a facial recognition technique; and
identify the detected face in an image associated with the reference media content item.

19. A non-transitory computer-readable medium containing computer-executable instructions that, when executed by a processor, cause the processor to perform a method for presenting related media content, the method comprising:
receiving a query media content item corresponding to a query episode;
selecting a portion of the query media content item;
receiving at least one reference media content item;
determining whether the reference media content item and the query media content item contain matching content;
identifying a related episode corresponding to the reference media content item in response to determining that the reference media item and the query media content item contain matching content; and
generating a dependency graph based at least in part on the query episode and the related episode.

20. The non-transitory computer-readable medium of claim 19, wherein the query media content item contains at least one video scene.

21. The non-transitory computer-readable medium of claim 20, wherein the method further comprises:
generating at least one video fingerprint from the portion of the query media content item; and
determining whether the reference media content item and the query media content item contain matching content based at least in part on the video fingerprint.

22. The non-transitory computer-readable medium of claim 19, wherein the query media content item contains at least one audio scene.

23. The non-transitory computer-readable medium of claim 22, wherein the method further comprises:
generating at least one audio fingerprint from the portion of the query media content item; and
determining whether the reference media content item and the query media content item contain matching content based at least in part on the audio fingerprint.

24. The non-transitory computer-readable medium of claim 19, wherein the method further comprises:
obtaining a transcript corresponding to the portion of the query media content item; and
determining whether the reference media content item and the query media content item contain matching content based at least in part on the transcript.

25. The non-transitory computer-readable medium of claim 19, wherein the dependency graph for the query episode includes relationship information between the query episode and a plurality of related episodes that includes the identified related episode.

26. The non-transitory computer-readable medium of claim 19, wherein the method further comprises:
receiving a user selection of the query episode;
identifying the related episode based at least in part on the dependency graph in response to receiving the user selection; and causing media content corresponding to the query episode and the related episode to be presented.

27. The non-transitory computer-readable medium of claim 19, wherein the method further comprises, further comprising:
  detecting at least one face in an image associated with the query media content item using a facial recognition technique; and
  identifying the detected face in an image associated with the reference media content item.

\* \* \* \* \*